US005088685A

United States Patent [19]

Salvucci, Sr.

[11] Patent Number: 5,088,685

[45] Date of Patent: Feb. 18, 1992

[54] GAS CYLINDER RING ASSEMBLY

[76] Inventor: Frank S. Salvucci, Sr., 1401 E. Palm, El Segundo, Calif. 90245

[21] Appl. No.: 650,600

[22] Filed: Feb. 5, 1991

[51] Int. Cl.[5] .............. F16M 13/00

[52] U.S. Cl. .............. 248/682; 248/317; 220/582

[58] Field of Search .............. 248/682, 317, 318; 220/581, 582

[56] References Cited

U.S. PATENT DOCUMENTS

| | | | |
|---|---|---|---|
| 597,024 | 1/1898 | Schmitz | 220/581 |
| 1,816,323 | 7/1931 | Gluck | 220/581 X |
| 1,958,582 | 5/1934 | Kerr et al. | 220/582 |
| 2,016,227 | 10/1935 | Clausen | 220/582 |
| 3,036,698 | 4/1936 | Hill, Jr. | 220/582 X |

FOREIGN PATENT DOCUMENTS

| | | | |
|---|---|---|---|
| 13496 | 6/1898 | United Kingdom | 220/582 |
| 119372 | 10/1918 | United Kingdom | 220/582 |
| 494796 | 11/1938 | United Kingdom | 220/582 |

*Primary Examiner*—Alvin C. Chin-Shue
*Attorney, Agent, or Firm*—Richard C. Litman

[57] ABSTRACT

A ring assembly for compressed gas cylinders includes either a separate adaptor removably attachable to existing gas cylinders or, a ring member integral with the top portion of manufactured cylinders. In any case, a ring plate provides a horizontal, radially disposed lift plate that serves to allow lifting, transporting and storage of the cylinders. In the adaptor version, the ring plate surrounds a collar having upper and lower portions respectively provided with external and internal threads. The lower portion threads engage with the existing external threads on the top portion of gas cylinders and which normally provide for attachment of the required safety cap while the upper portion threads duplicate the cylinder threads and thus enable attachment of the protector cap thereto. Manipulation or hanging of a cylinder equipped with the ring adaptor may be by manual grasping of the ring plate or by insertion of lift hooks into holes formed in the ring plate or by placing lift forks beneath the plate. Such lifting means may be part of a hand operated grappling device, suspended from a hoist line, mounted upon a hand truck or the like or, fixedly attached to a wall or panel. Securing and removal of the ring adaptor from a cylinder is facilitated through use of a spanner tool having prongs engageable within diametrically opposed notches on the periphery of the ring plate.

5 Claims, 4 Drawing Sheets

FIG. 4
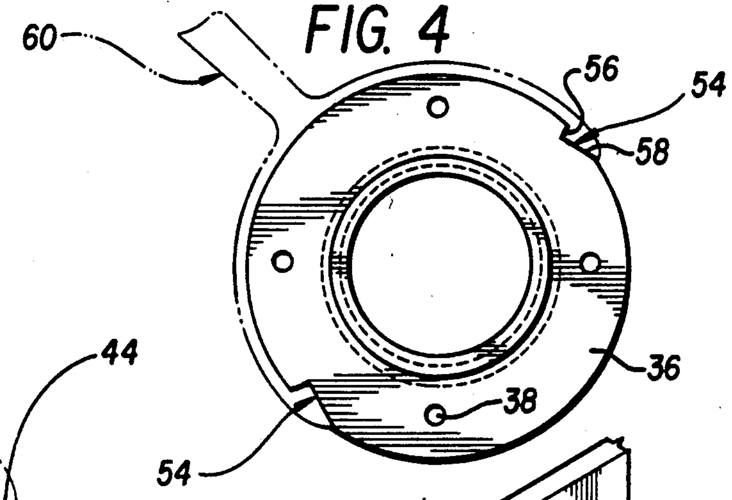
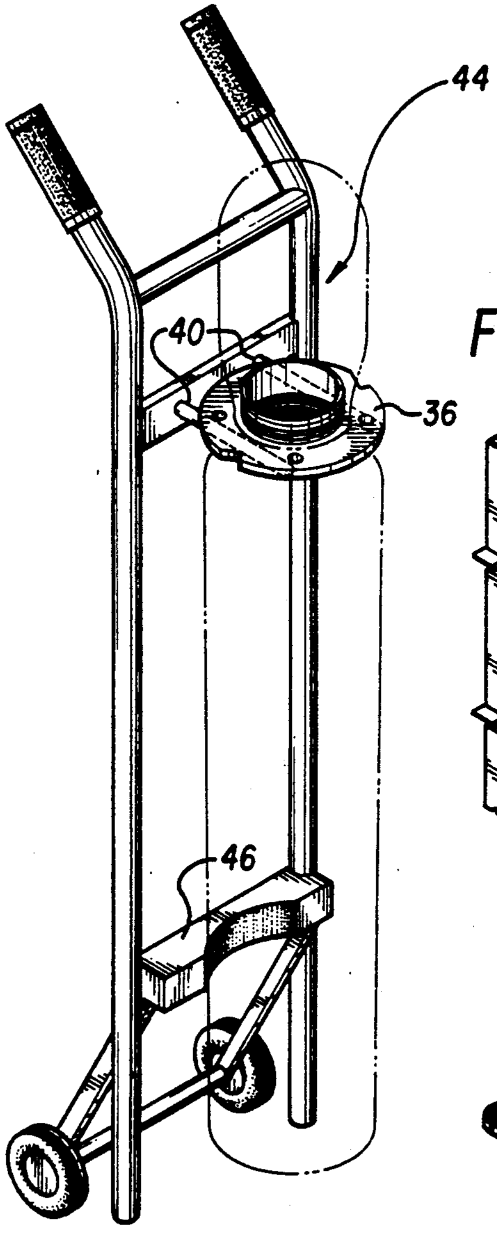
FIG. 5
FIG. 7
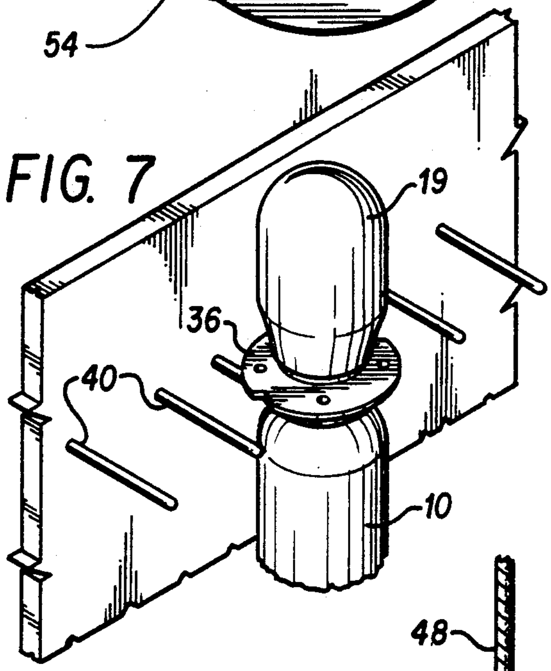
FIG. 6
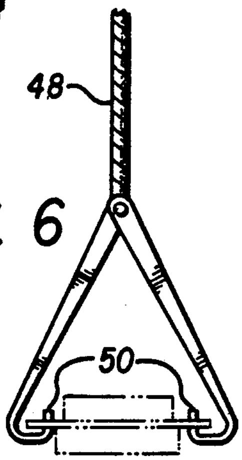
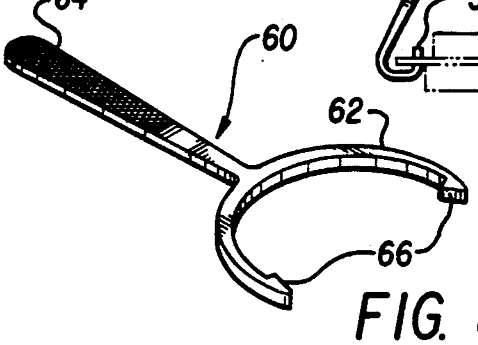
FIG. 8

GAS CYLINDER RING ASSEMBLY

FIELD OF THE INVENTION

This invention relates generally, to compressed gas cylinders and more particularly, to an improved ring assembly attachable either to existing gas cylinders or incorporated at the time of the cylinder manufacture and which provides improved means by which the cylinders may be carried as well as supported upon racks or the like.

BACKGROUND OF THE INVENTION

The manipulation and transport of compressed gas bottles or cylinders, whether full or empty, presents its problems due to the awkward configuration and weight of the cylinders. This will be appreciated when it is understood that the larger bottles may stand five feet tall and when filled, weight over 300 pounds. Such a mass, concentrated within a relatively small diameter and an elongated structure, presents an unwieldy body. The most prevalent manner of handling these cylinders comprises the use of a hand truck and wherein the cylinder must be tilted to permit the insertion of the truck foot plate therebeneath, after which the operator must retain control over the cylinder as it and the hand truck is rocked back and then pulled or pushed to its destination. Unloading the cylinder from the hand truck again requires careful manipulation of the cylinder, such as tilting and/or rocking, in order to remove it from the truck foot plate.

With the present invention, an improved gas cylinder device is proposed and which is readily affixed to the neck area of existing cylinders to provide means by which the cylinder may be lifted, transported and even subsequently hung from a rack if desired.

DESCRIPTION OF THE RELATED ART

No known prior art addresses the structure and function as called for by the instant invention. U.S. Pat. No. Des. 287,265 illustrates a gas cylinder neck ring per se and which appears to be used to form the top portion of a gas bottle and which includes the external threads as used to receive the required top cap serving to protect valve structure as associated with the cylinder. Examples of devices serving to provide hanger means for gas cylinders will be found in U.S. Pat. Nos. 3,765,635 and 4,889,306 issued to Burrell et al and Boucher, respectively. Each of these devices comprise displaceable clamping means adapted to encircle the body or neck of gas containers. None of the above patents is seen even to suggest the unique construction as taught by the present invention.

SUMMARY OF THE INVENTION

By the present invention, an improved ring assembly is provided whereupon existing compressed gas cylinders may be quickly supplied with a ring adaptor without any modification of the cylinders nor the need for any separate fastening means. Alternatively, at the time of manufacture of the cylinders, the same configuration as provided by the adaptor may be incorporated within the head structure of the cylinders. The adaptor includes a collar provided with lower, internal threads cooperating with the standard external threads existing on gas cylinder tops or heads and which is used for attachment of the required safety cap. In this instance, these cylinder threads allow for attachment of the ring adaptor. The collar upper portion is provided with external threads of identical pitch and root to those found on the cylinder top portion so that after mounting of the collar, the protective cap may be re-attached but now, to the ring adaptor. A circular flange or ring projects radially from the medial portion of the collar and includes engagement means adapted to cooperate with any of various lifting, carrying and hanger devices by which cylinders so equipped may be maneuvered, transported and stored. Additionally, strategically located catch means are provided on the outer periphery of the ring element to accommodate a locking and unlocking tool facilitating the attachment and removal of the ring adaptor.

Accordingly, one of the objects of the present invention is to provide an improved ring adaptor for compressed gas cylinders including a lift ring connected to a vertical, cylindrical collar having a lower portion provided with internal threads mating with existing threads on cylinders as for reception of the standard safety cap and which includes external threads on its upper portion which are similar to the original cylinder cap threads to permit the relocated attachment of the safety cap.

An additional object of the present invention is to provide an improved ring assembly for compressed gas cylinders including a cylinder head portion having an integral radially extending ring or flange disposed beneath the usual threads for retaining a protective cap whereby, various lifting or supporting members may be used to transport and store the cylinders by engagement with the undersurface of the ring.

Another object of the present invention is to provide an improved ring adaptor for compressed gas cylinders comprising a radial lift flange having thread attachment means connectable with existing cylinder threads for receiving a safety cap and wherein the lift flange includes engagement means for the reception of a lifting tool or hanger member as provided on a hand truck, within a transport vehicle or in a storage area.

A further object of the present invention is to provide an improved ring adaptor for compressed gas cylinders including a threadedly attached lift ring removably connected to the existing threads in the neck area of the cylinders and which includes a replica of the original cylinder threads to permit attachment of the required safety cap.

Still another object of the present invention is to provide an improved ring adaptor for compressed gas cylinders comprising a threaded collar supporting a radial lift ring and which is removably attachable intermediate existing threads atop a gas cylinder and a standard safety cap.

Another object of the present invention is to provide an improved ring adaptor for compressed gas cylinders including a removable threaded collar supporting a radial lift ring having diametrically opposed tool engaging means allowing of both tightening and loosening of the ring adaptor from the existing threads on the top of gas cylinders.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 4 is a top plan view of the ring adaptor;

FIGS. 5 and 6 illustrate two examples of lifting and transporting devices usable with the present lift ring;

FIG. 7 is a fragmentary perspective view showing a manner of storing gas cylinders provided with the present lift ring;

FIG. 8 is a plan view of a wrench usable to apply and remove the lift ring;

Similar reference characters designate corresponding parts throughout the several figures of the drawings.

DESCRIPTION OF THE PREFERRED EMBODIMENT

Figure 1:
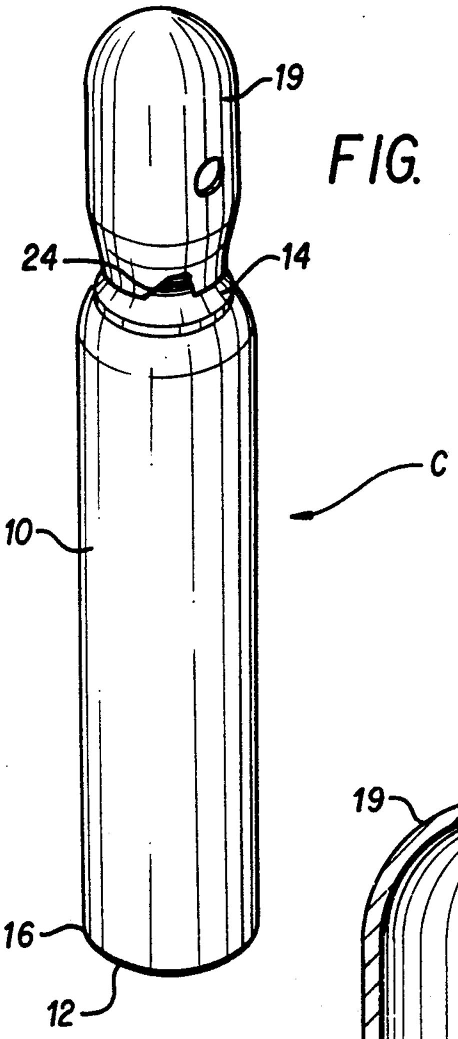
FIG. 1 is a partial side elevation of a typical gas cylinder with an attached protective cap.

Referring now to the drawings, FIG. 1 illustrates a typical cylinder C as used to provide for the transport, storage and use of any of several types of compressed gasses. These cylinders C comprise a metal body having an elongated circular wall 10 of constant diameter and which extends from a relatively flat bottom 12 to a necked down head or top portion 14. As the length or height of the cylinders often reaches and even exceeds five feet, it will be appreciated that the manipulation, transport and storage thereof can require considerable manpower, as the total weight of any one cylinder may exceed 200 pounds. As much smaller gas cylinders may be readily handled simply by hoisting across one's shoulder, it follows that the ring assembly R or R' as presented herein will be most applicable to the larger and heavier cylinders which until now, have been manipulated by manually tilting the cylinder and then rolling it about the peripheral edge 16 of its bottom 12.

Cylinders C when filled with compressed gas, are provided with a valve assembly 18 which is threaded into a tapped opening in the cylinder top portion 14. Regulations call for a protective cap 19 to be applied atop a cylinder containing gas to prevent inadvertent actuation or damage to the valve assembly 18. It will be appreciated that the unintentional release of many type of compressed gasses may lead to disastrous consequences. Such danger exists even when a single cylinder is being transported or merely stored in a warehouse. In the former case, hold-down chains or other tie-down means may break during motion of the truck or other transport vehicle with the cylinder then falling upon its side and the valve assembly striking an object causing its breakage while in the latter instance, a workman or piece of equipment may knock over an upright cylinder with the same consequence.

The protective caps 19 comprise a unitary piece of metal having a lower circular skirt 20 provided with internal threads 22 mating with external threads 24 formed on the cylinder top portion 14 whereupon a simple maneuver permits one to remove and attach the cap 19 before and after dispensing of the gas contents of any cylinder 10.

Figure 3:
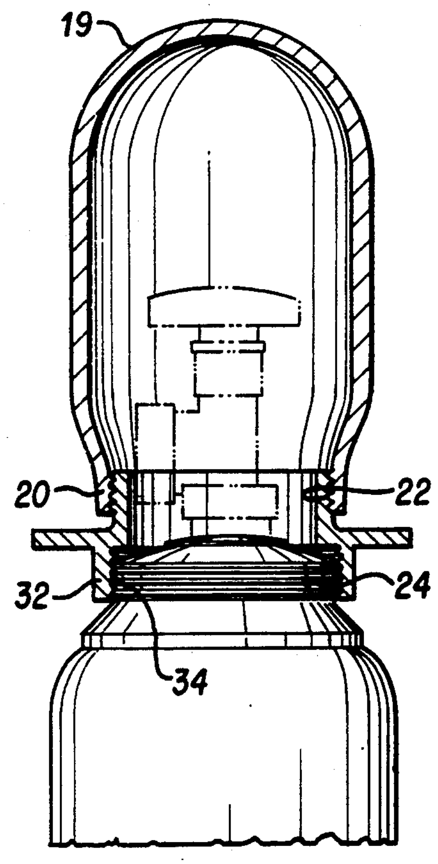
FIG. 3 is an enlarged vertical cross-section illustrating the ring adaptor as installed.

The ring assembly R comprises a ring adaptor R that permits one to readily modify existing gas cylinder C to provide for convenient lifting, transport and storage means noticeably enhancing the use of the cylinders and without the necessity of any prior modification of the cylinders. The ring adaptor R will be seen to include a circular collar 26 having an upper portion 28 provided with external threads 30 of the same diameter as those threads 24 of the cylinder top portion 14. This upper portion 28 is joined to a larger diameter lower portion 32 having internal threads 34 matching the cap skirt threads 22 and thus adapted to fit about the cylinder threads 24. A circular lift or ring plate 36 projects radially from the medial portion of the collar 26. With the above construction in mind it will be appreciated that upon removal of a protector cap 19, the ring adaptor R may be secured by interengaging the respective threads 34 and 24 and rotating the adaptor to fully seat these cooperating threads. Then, at any time, the protector cap 19 may be attached or removed from the secured ring collar 26 by means of the respective threads 22 and 30. In the attached condition, the assembly will appear as in FIG. 3 of the drawings wherein it will be seen that the attachment of the ring adaptor R intermediate the cylinder and cap presents no impediment to the normal removal of the cap and subsequent operation of the valve assembly 18.

Figure 2:
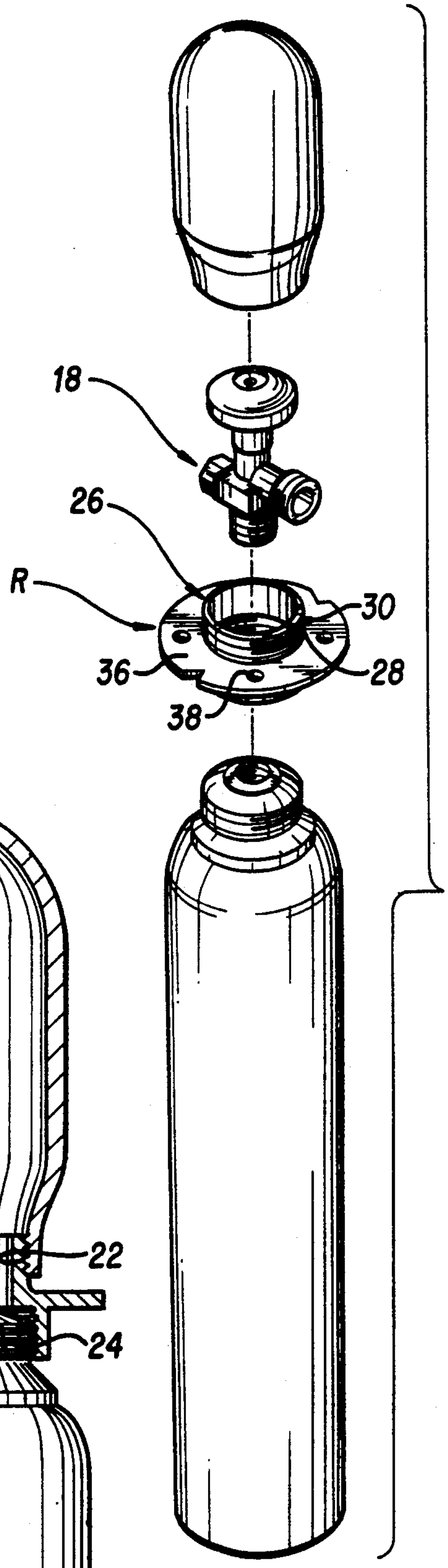
FIG. 2 is an exploded side elevation of a standard gas cylinder, depicting the addition of the ring adaptor of the present invention.

The attachment of the ring adaptor R provides a stable, horizontal platform which greatly facilitates the handling and storage of thus-equipped gas cylinders C. For cylinders of say 50 pounds or less, the ring plate 36 offers a convenient means serving as a handle and which may be grasped by two hands on opposite sides thereof to assist in lifting and carrying the cylinder for short distances. In most cases however, the cylinders are too heavy to simply lift up and carry and so means are provided on the ring adaptor to accommodate any of various tools or aids. As shown in FIGS. 2, 4 and 6, a plurality of openings 38 are formed through the horizontal ring plate 36, preferably four equi-spaced such openings 38. In this manner, suitable engagement means such as the prongs or forks 40 forming a pair of lift members as shown in FIG. 5 may be placed beneath opposite side portions of the ring 36, to lift, support and allow transport of a gas cylinder C. This figure depicts the lift members 40 as mounted upon a wheeled hand truck 44 and by engagement of these lift members beneath the ring plate 36 as the hand truck 44 is tilted backwards, the center of gravity exerted by the cylinder C will be understood to urge the lower portion of the cylinder wall 10 to be biased against the abutment plate 46 spanning the lower reaches of the hand truck 44. With this arrangement, the hand truck may be tilted forwardly to lower the lift elements 40 and allow their placement beneath the ring plate 36 and thence, upon tilting the hand truck backwards, the cylinder is lifted and ready for transport to another location.

Well known hoist means may be used, either alone or in combination with the above described hand truck transport means. FIG. 6 illustrates a hoist line 48 from which depend a pair of hook elements 50—50 engageable with either two adjacent or diametrically opposed ones of the ring plate holes 38 to permit lifting and transport of the cylinders C.

The same or similar lift members 40 may be used to provide hanger devices suitable for suspending the cylinders C in a storage environment as shown in FIG. 7 wherein, a plurality of pairs of the lift members 40 are affixed to a wall, rack or the like and upon which the ring plates 36 are placed to support the cylinders.

As shown in FIG. 4, a pair of diametrically opposed toolengageable notches 54—54 are provided in the periphery of the ring plate 36 with each notch formed by a nearly radial shoulder 56 and joined inclined ramp 58. With this structure, a suitable spanner wrench 60 as shown in FIG. 8 may be used to both tighten and loosen the ring adaptor R from a single position. This is achieved by inserting the wrench with its semi-circular portion 62 juxtaposed that portion of the ring plate periphery intermediate the two shoulders 56—56 so that when the handle 64 is moved to either side, the wrench prongs 66—66 respectively tighten or loosen the ring adaptor R relative the cylinder C.

Figure 9:
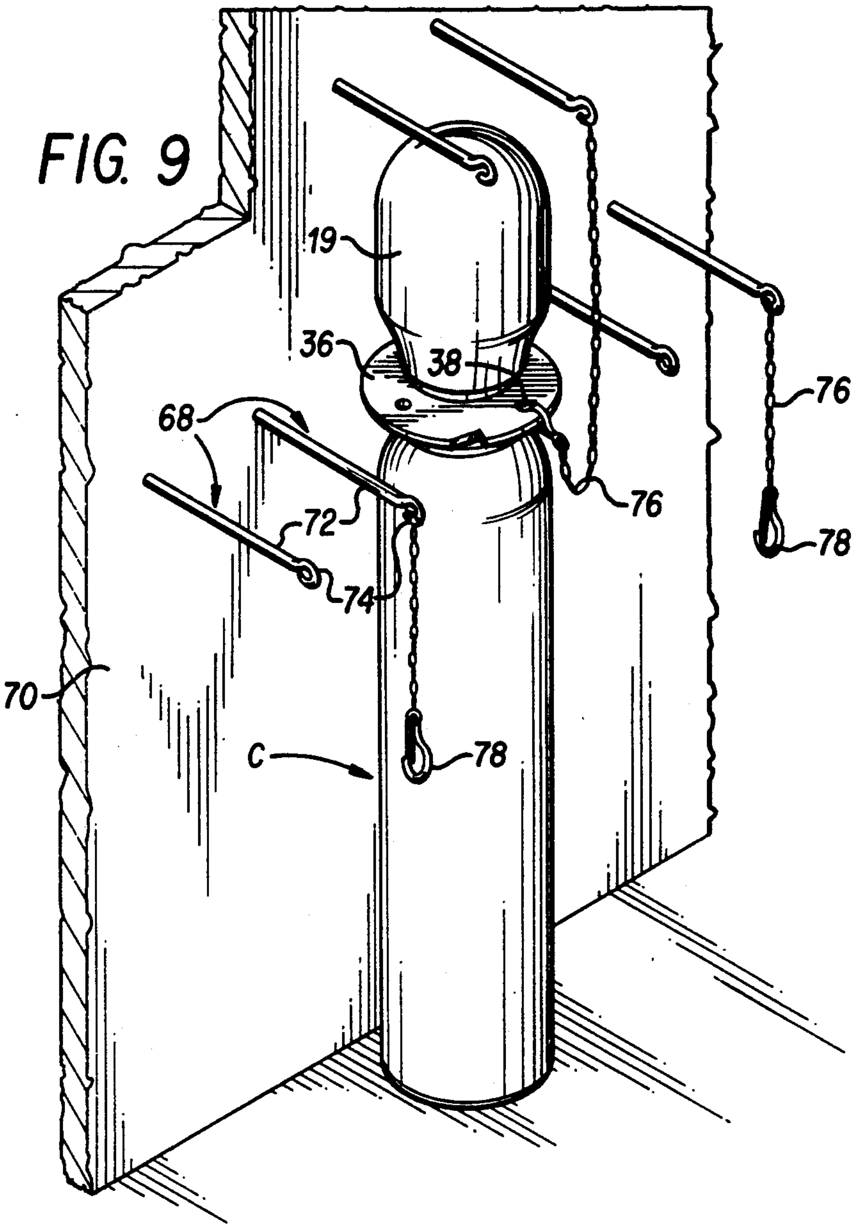
FIG. 9 is a perspective view of an alternative manner of storing gas cylinders equipped with the present lift ring.

In the alternative storage arrangement shown in FIG. 9, the lift or support elements 68 projecting from the wall 70 will be seen to include a horizontal shank 72 terminating in a enlarged eyelet 74. Pairs of the support elements 68 are again spaced apart from one another an appropriate distance to insure that they will engage the underside of a lift ring 36 as shown. The length of the shanks 72 is sufficient enough to position the eyelets 74 forwardly of the ring periphery. In this manner, the enlarged formation presented by the eyelets will be seen to act as an abutment and thereby assists in retaining the associated cylinder in place. This retention is further enhanced by use of the tether 76 and which may comprise any suitable flexible member such as the illustrated chain. One end of the tether chain is affixed to the eyelet 74 while its opposite, free end is provided with a removable fastener, such as the snap-hook 78. With this construction, the snap-hook 78 may be engaged within one of the ring flange holes 38 to resist tipping over of the cylinder should it be dislodged, as by a moving piece of equipment.

Figure 10:
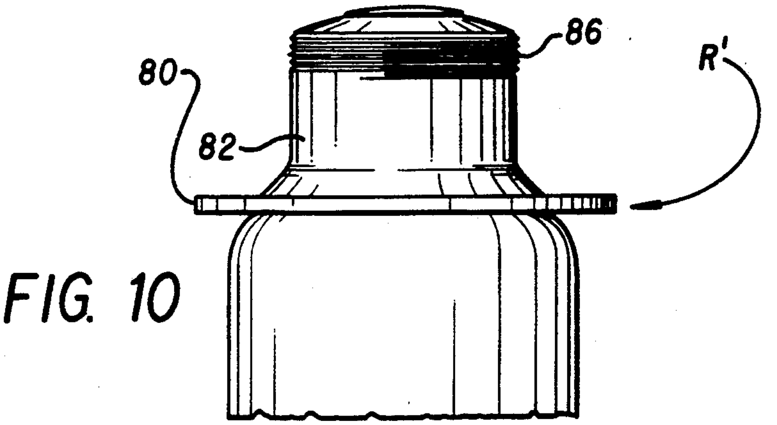
FIGS. 10-11 are partial elevational view of alternative constructions wherein the lift ring is integral with the cylinder top portion.
Figure 11:
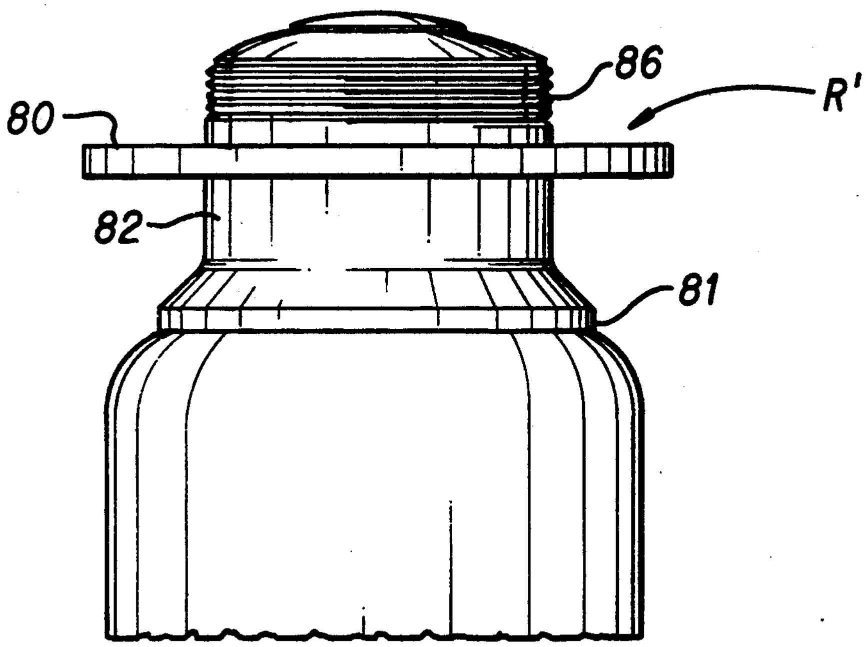

As mentioned previously, the lift ring may comprise an integral or relatively fixed part of the cylinder head portion and this feature is depicted in FIGS. 10-11 of the drawings wherein it will be seen that the radially extending ring 80 is provided as a part of the cylinder top portion 82 and functions in the same manner as described hereinabove. During the assembly of compressed gas cylinders, the head portion comprises a separate dome-like member that is formed with the valve-receiving passage and the adjacent threads for the protective cap. This head is then forged to the top of the cylindrical main body of the cylinder. With the top portion 82, the ring assembly R′ is produced by forming the ring flange 80 as a component fixed relative the top portion 82 and disposed below the upper threads 86, either in the intermediate plane as in FIG. 11 or, at the juncture of the top portion 82 and main cylinder body, as in FIG. 10.

From the above it will be appreciated that a unique ring assembly for compressed gas cylinders is presented and which is usable with existing cylinders without any modification thereof or, incorporated within the top portion of cylinders being manufactured, in order to provide ready means by which the cylinders may be lifted, transported and stored and which during use thereof, allows for the usual attachment and removal of the standard protective cap.

It is to be understood that the present invention is not limited to the sole embodiments described above, but encompasses any and all embodiments within the scope of the following claims.

I claim:

1. In a gas cylinder having a narrowed top portion provided with external threads of a diameter substantially less than the diameter of the gas cylinder and adapted to releasably receive internal threads formed on the skirt of a protector cap, the improvement comprising:

a removable unitary ring adaptor having a circular collar provided with an upper portion and a lower portion, a radially projecting ring plate on said ring adaptor intermediate said upper and lower portions and having a diameter substantially greater than the gas cylinder top portion to provide a clearance therebeneath fully throughout its circumference, said ring adaptor lower portion having internal threads matching in diameter the internal threads on the skirt of the protector cap and mating with and engageable with the external threads on the gas cylinder top portion, and said ring adaptor upper portion having external threads matching in diameter the external threads on the gas cylinder top portion and mating with and engageable with the internal threads on the skirt of the protector cap, whereby a protector cap attached to a gas cylinder with its internal threads engaging the external threads on the gas cylinder top portion may be removed and said ring adaptor attached to the gas cylinder by engagement of said lower portion internal threads with the gas cylinder top portion external threads and the protector cap attached to said ring adaptor with the protector cap internal threads engaging said external threads on said upper portion, and said ring plate thereby providing engageable means by which the attached gas cylinder may be lifted, transported and stored.

2. In a gas cylinder according to claim 1 wherein, said ring plate includes a plurality of holes therethrough, whereby said ring adaptor and attached cylinder may be lifted by insertion of lift means within said holes.

3. In a gas cylinder according to claim 1 wherein, said ring plate includes a circular periphery, and a pair of tool-engaging notches within said ring plate periphery.

4. In a gas cylinder according to claim 1 wherein, the diameter of said ring plate is greater than the diameter of said cylinder.

5. In a gas cylinder according to claim 2 wherein, said plurality of holes includes diametrically opposed pairs of holes.

* * * * *